United States Patent
Wang et al.

(10) Patent No.: US 9,231,668 B2
(45) Date of Patent: Jan. 5, 2016

(54) RADIO APPARATUS AND METHOD OF OPERATING THE SAME

(75) Inventors: Lingfeng Wang, Bristol (GB); Justin Coon, Bristol (GB); Yue Wang, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/357,356

(22) PCT Filed: Nov. 9, 2011

(86) PCT No.: PCT/GB2011/001578
§ 371 (c)(1),
(2), (4) Date: Aug. 13, 2014

(87) PCT Pub. No.: WO2013/068705
PCT Pub. Date: May 16, 2013

(65) Prior Publication Data
US 2015/0043670 A1    Feb. 12, 2015

(51) Int. Cl.
*H04B 7/02* (2006.01)
*H04B 7/04* (2006.01)
*H04W 16/14* (2009.01)
*H04B 17/382* (2015.01)
*H04B 7/06* (2006.01)
*H04B 7/08* (2006.01)
*H04W 24/10* (2009.01)

(52) U.S. Cl.
CPC ............ *H04B 7/0404* (2013.01); *H04B 17/382* (2015.01); *H04W 16/14* (2013.01); *H04B 7/0691* (2013.01); *H04B 7/0848* (2013.01); *H04B 7/0874* (2013.01); *H04W 24/10* (2013.01)

(58) Field of Classification Search
CPC . H04W 24/10; H04W 16/14; H04W 74/0808; H04W 16/10; H04W 72/085; H04B 7/0404; H04B 7/0874; H04L 27/0006
USPC ......... 375/267, 285, 316, 340, 342, 346, 349; 370/329–330, 334, 341; 455/101, 450, 455/509, 67.11, 452, 455
See application file for complete search history.

(56) References Cited

U.S. PATENT DOCUMENTS

| | | | |
|---|---|---|---|
| 7,610,036 B2 | 10/2009 | Teo et al. | |
| 8,326,313 B2 * | 12/2012 | McHenry et al. | 455/454 |
| 2008/0125047 A1 | 5/2008 | Li et al. | |
| 2008/0139213 A1 | 6/2008 | Coersmeier | |
| 2009/0149208 A1 * | 6/2009 | Huttunen et al. | 455/509 |
| 2010/0220707 A1 * | 9/2010 | Teo et al. | 370/343 |
| 2010/0232380 A1 * | 9/2010 | Choi et al. | 370/329 |
| 2012/0315944 A1 * | 12/2012 | Jeon et al. | 455/512 |
| 2013/0090145 A1 * | 4/2013 | Wang et al. | 455/509 |
| 2013/0157580 A1 * | 6/2013 | Qiu et al. | 455/67.11 |

(Continued)

OTHER PUBLICATIONS

International Search Report issued May 15, 2012, in PCT/GB2011/001578, filed Nov. 9, 2011.

(Continued)

*Primary Examiner* — Khanh C Tran
(74) *Attorney, Agent, or Firm* — Oblon, McClelland, Maier & Neustadt, L.L.P.

(57) ABSTRACT

Channel activity and subsequent access is determined by antenna selection. A sensing period is allocated into slots, dependent on the number of available antennas. For each slot, a distinct set of antennas is used for sensing for channel activity. Results of channel activity measurements for the slots are combined to form a channel activity report.

15 Claims, 9 Drawing Sheets

(56) References Cited

U.S. PATENT DOCUMENTS

2013/0322279 A1* 12/2013 Chincholi et al. ............ 370/252
2014/0029516 A1* 1/2014 Heo et al. ..................... 370/328
2015/0003508 A1* 1/2015 Lee et al. ....................... 375/224

OTHER PUBLICATIONS

Stephen Wang, et al., "Antenna Selection Based Spectrum Sensing for Cognitive Radio Networks", IEEE 22$^{nd}$ International Symposium on Personal, Indoor and Mobile Radio Communications, XP 032102383, Sep. 11, 2011, pp. 364-368.

Muhammad Fainan Hanif, et al., "MIMO Cognitive Radios with Antenna Selection", IEEE Transactions on Wireless Communications, vol. 10, No. 11, XP 011389715, Nov. 2011, pp. 3688-3699.

Office Action issued Aug. 25, 2015 in Japanese Patent Application No. 2014-540544 (with English translation).

* cited by examiner

RADIO APPARATUS AND METHOD OF OPERATING THE SAME

FIELD

Embodiments described herein reside in the field of cognitive radio.

BACKGROUND

In some cognitive radio systems the secondary users need to sense the availability of the spectrum before it can access the spectrum. In such a case, the accuracy of the results of spectrum sensing is critical for both primary and secondary systems. Multi-antenna techniques have been discussed in the literature to enhance the performance (accuracy) of spectrum sensing. However, in many arrangements already set forth in the field, all antennas at the secondary receiver are used for spectrum sensing purposes, indicating that all RF chains at the secondary receiver have to be used.

DETAILED DESCRIPTION

Figure 1:
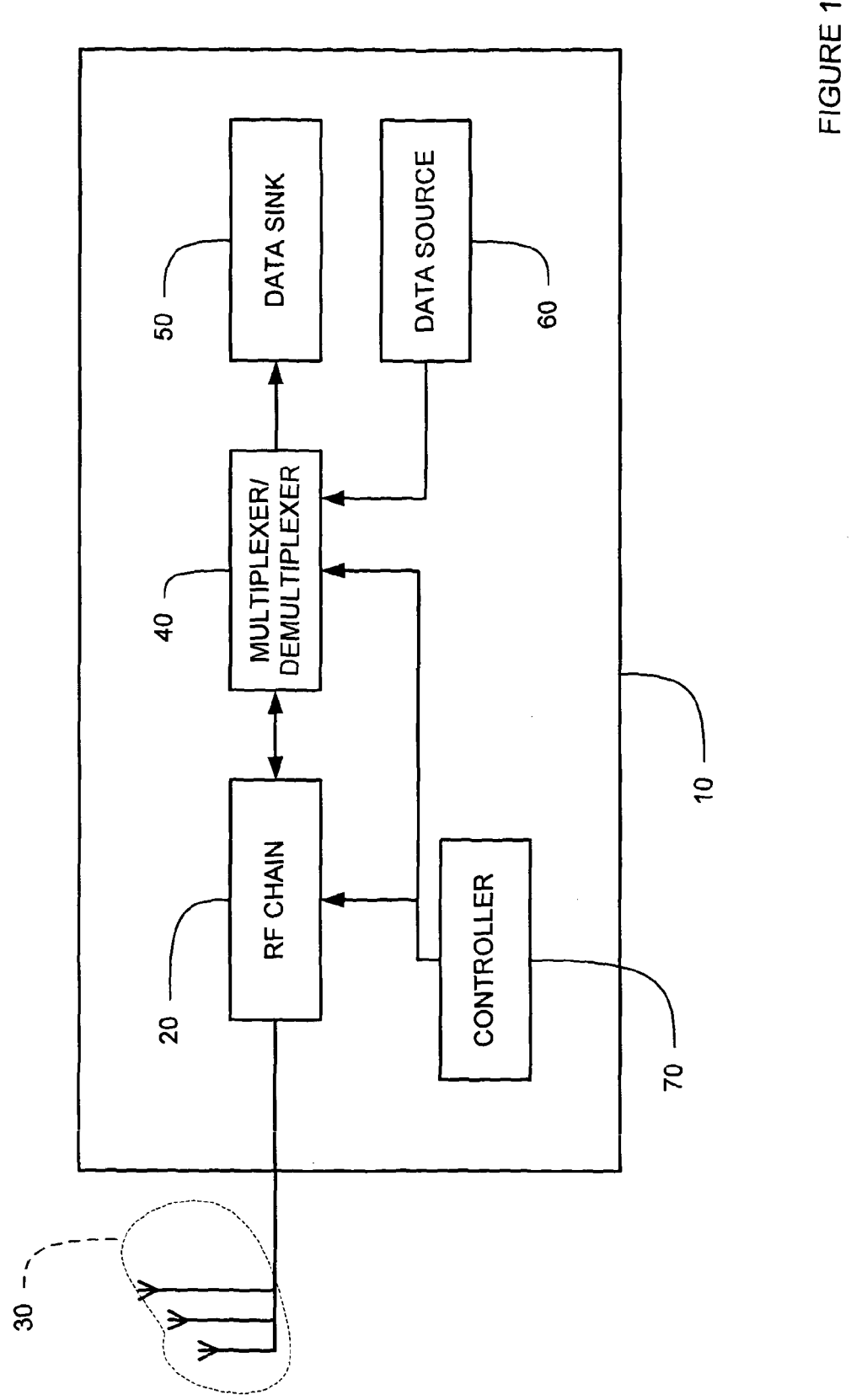
FIG. 1 is a general system diagram for a communications device in accordance with a described embodiment.

According to one embodiment, antenna selection is employed, due to its low implementation complexity. In a particular example, a spectrum sensing scheme is used, where one or a subset of antennas are used to sense the spectrum for a period of time, followed by another spectrum sensing performed by another one or subset of antennas over a subsequent period of time.

According to one embodiment, a method is provided by which sensing is carried out for a period of time, whereby this time period is divided into smaller periods, during each of which sensing is performed using an antenna or subset of antennas, which may vary over the course of the total sensing period.

The said one or a subset of antennas may be different in different time slots.

A weighting factor may be used to post process the received samples from different antennas.

The one or a subset of antennas can be selected through an antenna selection algorithm.

Variable weighting factors for each sub-slot may be used.

The sensing sub-slots may be of different length.

Cognitive radio (CR) facilitates efficient use of the radio spectrum. In cognitive radio systems, unlicensed users (secondary users) can use spectrum that has been pre-allocated to a licensed user (primary user) when such spectrum is not used by the primary user. The reader will appreciate that more than one primary user can be licensed, each to a different portion of the useable radio spectrum.

In some cognitive radio systems, when a secondary user attempts to access spectrum resources which have been pre-assigned to a primary users, the secondary user needs first to sense the spectrum and then to access the spectrum according to the sensing results. Ideally, to guarantee the priority of transmission by the primary user, as well as to maintain the transmission of the secondary link, the secondary user needs to have an accurate and reliable sensing capability in a limited sensing period in order to ensure safe and efficient operation. In particular, a higher detection probability is desired for a higher protection level to a primary system while a lower false alarm probability offers a better opportunistic access to secondary users.

Most approaches to multiple-antenna spectrum sensing have focused on parallel sensing which requires simultaneous use of multiple RF chains. This mandates high complexity and energy consumption.

An embodiment as set forth herein uses antenna selection to improve the performance of spectrum sensing. In particular, by dividing the total sensing period into several sub-slots, and by using a subset of antennas (a subset containing one or more antennas) to perform spectrum sensing within each slot sequentially, a substantial sensing gain can be obtained compared to using a single antenna for spectrum sensing throughput the sensing period. Meanwhile hardware complexity/cost and corresponding energy consumption is reduced, compared to parallel multiple-antenna sensing which utilize multiple RF chains simultaneously.

Certain implementations of this scheme provide enhanced sensing accuracy, while at the same time keeping a low implementation complexity as only one or a subset of RF chains are used in a given time period.

A suitable communications device 10 is illustrated in FIG. 1. The communications device 10 comprises an RF chain 20, connected to a plurality of antennas 30. The RF chain 20 is connected to a multiplexer/demultiplexer 40, which intervenes between a data sync 50 and a data source 60. A controller 70 controls the operation of the RF chain 20 and the multiplexer/demultiplexer 40.

Figure 2:
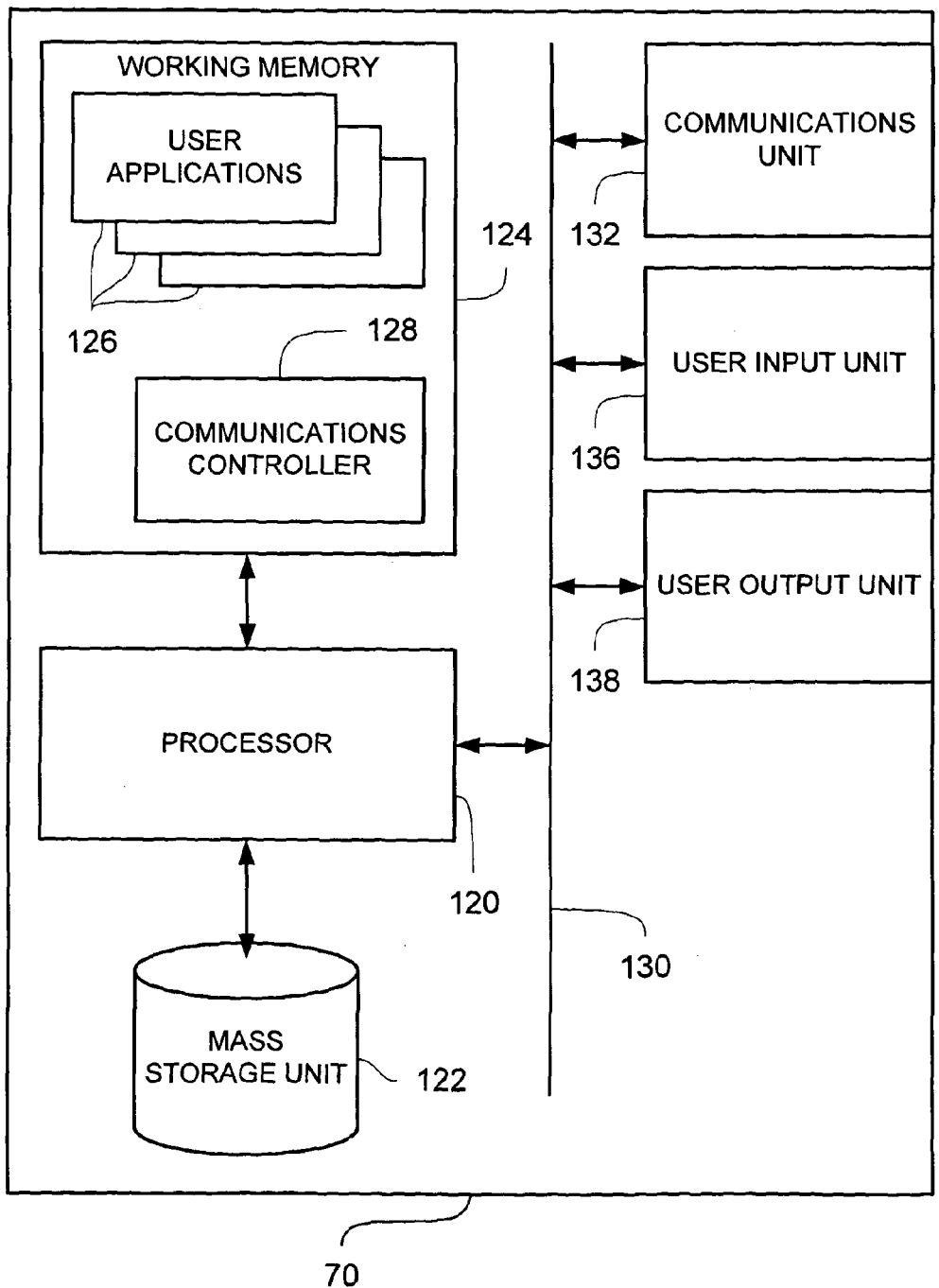
FIG. 2 is a schematic diagram of a typical computerised controller embodying a controller of the device of figure.

The controller 70 is illustrated in further detail in FIG. 2. In general terms, the controller 70 comprises a general purpose computer. In accordance with this, the controller 70 comprises a processor 120, operable to execute computer executable instructions. The instructions may be stored in a mass storage unit 122, along with associated data. For convenience, a working memory 124 is provided, for more rapid access to instructions and data. In accordance with this, user applications 126 and a communications controller 128 are illustrated as being stored in working memory 124. A general purpose bus 130 is provided, for communication with a communications unit 32, providing connectivity to other apparatus as required, and a user input unit 136 and a user output unit 138. The user output unit 138 may comprise, in a particular example, video and or audio output means, while the user input unit 136 may comprise a keypad, keyboard, touchscreen means, audio input means or any other suitable user input apparatus.

Performance of the controller 70, under the instruction of the communications controller 128 application, will now be described.

Figure 3:
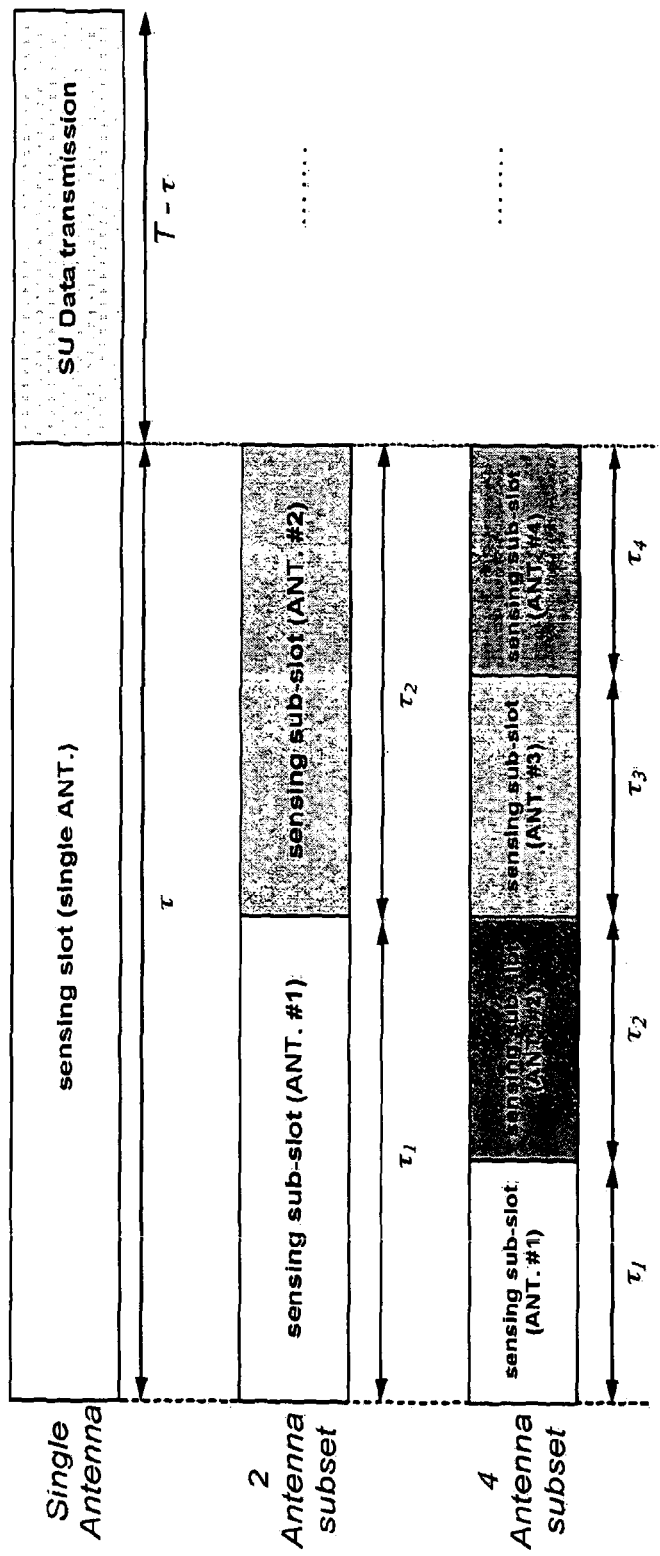
FIG. 3 is a timing diagram for sensing in accordance with the embodiment, for various antenna configurations.

As shown in FIG. 3, in accordance with this approach, for M antennas, one sensing slot $\tau$ is divided into M sub-slots $\tau_i$, that is:

$$\tau = \sum_{i=1}^{M} \tau_i.$$

Considering the availability of one RF chain, it is only possible for one antenna to be active and to perform spectrum sensing in each sub-slot. However, sensing performance gain is still expected through exploiting the spatial diversity of these antennas with different channel gains.

Energy detection is used by a secondary user in each sensing sub-slot. The test statistic for energy detection in the $i^{th}$ sub-slot is given as:

$$T_i(y) = \frac{1}{N_i} \sum_{n=1}^{N_i} |y_i(n)|^2 \tag{1}$$

where the number of samples in each sub-slot is $N_i = \tau_i f_s$ and $f_s$ is the sampling frequency.

For the $i^{th}$ sub-slot, the observations sensed by a secondary user can be associated with one of two hypotheses. Hypothesis $H_1$ is that the primary user is active and Hypothesis $H_0$ is that the primary user is inactive. Thus:

$$H_1: y_i(n) = h_i s_i(n) + u_i(n) \tag{2}$$

$$H_0: y_i(n) = u_i(n) \tag{3}$$

where:
$s_i(n)$ is the primary user's signal with power level $$\sigma_s^2 = \frac{1}{N_i} \sum_{n=1}^{N_i} |s_i(n)|^2$$

and
$h_i$ is the channel gain of the $i^{th}$ sub-slot.

$h_i$ is assumed to be constant during the $i^{th}$ sensing sub-slot. However, it could be different from sub-slot to sub-slot, taking account of the different antennas which may be applied. The noise $u_i(n)$ is assumed to be a complex Gaussian Independent and Identically Distributed (IID) random signal with zero mean and variance $\sigma_u^2$.

$s_i(n)$ and $u_i(n)$ are assumed to be independent, and both $\sigma_s^2$ and $\sigma_u^2$ can be assumed to be a priori information in some cases.

The received signal to noise ratio (SNR) of the PL) measured at the SU during the $i^{th}$ sub-slot is denoted as $$\gamma_i = |h_i|^2 \gamma = \frac{|h_i|^2 \sigma_s^2}{\sigma_n^2}.$$

Corresponding detection and false alarm probabilities $P_d^{(i)}$ and $P_{fa}^{(i)}$ respectively are given by:

$$P_{fa}(i) = P(T_i(y) > \epsilon_i | H_i 0) = Q((\epsilon_i/\sigma_{75} u^\uparrow 2) - 1) \sqrt{(N_i 1)} \tag{4}$$

$$P_d(i) = P(T_i(y) > \epsilon_i | H_i 1) = Q((\epsilon_i/\sigma_{75} u^\uparrow 2) - \gamma_i - 1) \sqrt{(N_i/(2\gamma_i + 1))} \tag{5}$$

where $\epsilon_i$ is the detection threshold for the $i^{th}$ sub-slot.

$$Q(x) = \frac{1}{\sqrt{2\pi}} \int_x^\infty e^{-\frac{t^2}{2}} dt$$

is Gaussian tail probability.

The sensing decision is made by the method of data fusion where the observations from all sub-slots are processed jointly. The test statistics are given as:

$$T(y) = \sum_{i=1}^{M} g_i^2 T_i(y) \tag{6}$$

where $g_i$ is the weighting factor of the $i^{th}$ sub-slot. For example, when the channel gain $h_i$ is unknown, $$g_i = \frac{1}{\sqrt{M}}$$

is chosen for a balanced/same weighting. When sensing slot are divided evenly $$\left(\text{i.e. } \tau = \sum_{i=1}^{M} \tau_i = M\tau_i\right),$$

the sensing performance is presented as:

$$P_{fa} = Q\left(\beta Q^{-1}(P_{d_t}) + \sqrt{\frac{N_i}{M}} \sum_{i=1}^{M} \gamma_i\right) \tag{7}$$

$$P_d = Q\left(\frac{1}{\beta} (Q)^{-1}(P_{fa_t}) - \sqrt{\frac{N_i}{M}} \sum_{i=1}^{M} (\gamma_i)\right) \tag{8}$$

The detection threshold $\epsilon$ of a target detection probability $P_{d_t}$ and target false alarm probability $P_{fa_t}$ can be derived from equations (4) and (5) respectively as follows:

$$\varepsilon = \begin{cases} \sigma_u^2 \left(\frac{1}{\sqrt{N}} Q^{-1}(P_{fa_t}) + 1\right), & \text{given } P_{fa_t} \\ \left(\frac{1}{M} \sum_{i=1}^{M} |h_i|^2 \sigma_s^2 + \sigma_n^2\right)\left(\frac{1}{\sqrt{N}} Q^{-1}(P_{d_t}) + 1\right), & \text{given } P_{d_t} \end{cases} \tag{9}$$

with sample numbers of $N = N_i M$

The primary system is claimed to be detected when $T(y) > \epsilon$ in the case of $H_1$. However it can be a false alarm if $T(y) > \epsilon$ in $H_0$.

In the case of known channel gain $h_i$, the weighting factor $g_i$ can be optimised in the low SNR regime as follows:

$$g_i = \frac{|h_i|^2}{\sqrt{\sum_{i=1}^{M} |h_i|^4}} \tag{10}$$

Thus, the corresponding sensing performance in this case is given as:

$$P_{fa} = Q\left(\beta_1 Q^{-1}(P_{d_\tau}) + \gamma\sqrt{N_i}\sum_{i=1}^{M}g_i|h_i|^2\right) \quad (11)$$

$$P_d = Q\left(\frac{1}{\beta_1}\left[(Q]^{-1}(P_{fa_t}) - \gamma\sqrt{N_i}\sum_{i=1}^{M}g_i|h_i|^2\right]\right) \quad (12)$$

where $$\beta_1 = \sqrt{1 + 2\sum_{i=1}^{M}g_i^2\gamma_i}.$$

Considering the application of antenna selection in each sensing slot, each sub-slot $\tau_i$ may experience a different channel gain (i.e. different $\gamma_i$), and therefore different average channel gains occur in different sensing slots $\tau$. This can lead to change of the detection threshold from one sensing slot to another for a target sensing performance.

In the case when different weighting factors are applied in the test statistics T(y), these thresholds can be calculated from the statistic distribution of T(y) using the Central Limit Theorem and the inverse cumulative distribution function.

Figure 4:
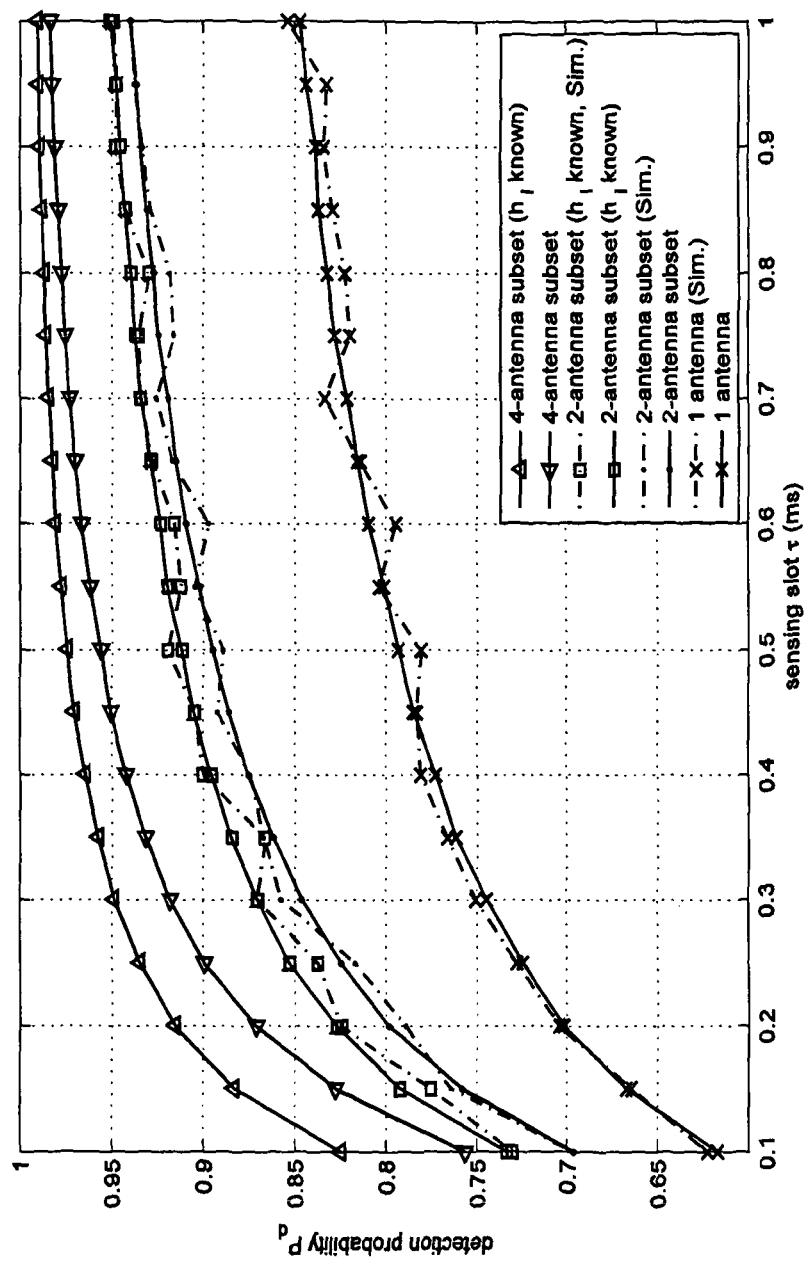
FIGS. 4 to 8 are graphs illustrating experimental results for examples of the described embodiment.
Figure 5:
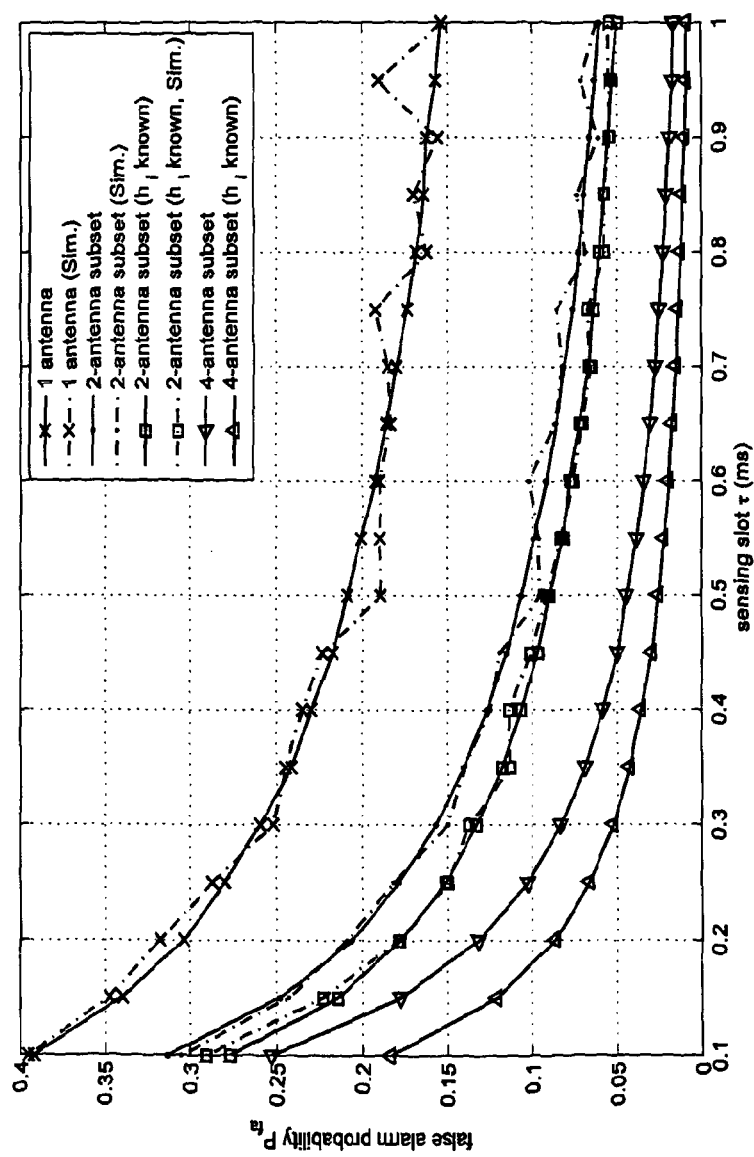
Figure 6:
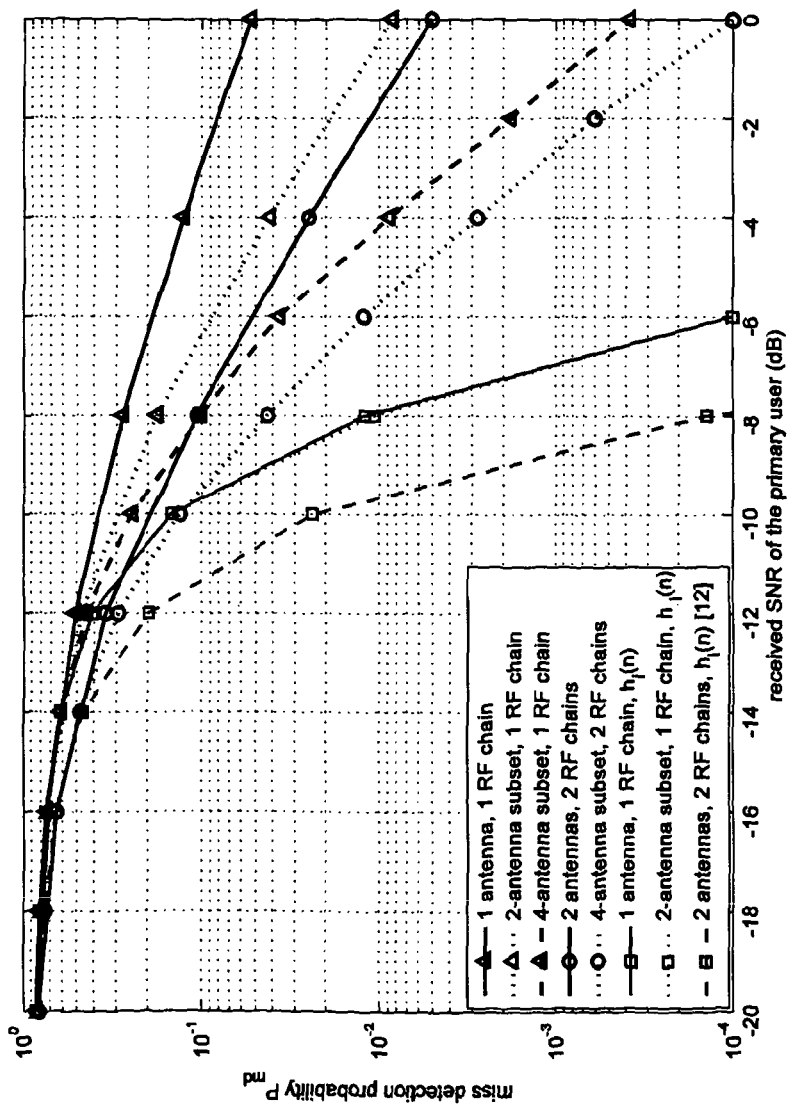

As shown in FIG. 4 and FIG. 5, both analytical and simulation results between single antenna and antenna selection performances are given under the target detection probability (0.9) and the target false alarm probability (0.1) respectively. Channel gain h, is zero-mean, unity variance complex Gaussian random variables. The number of sensing slots simulated is $10^4$ with an average received primary user's SNR of −10 dB. Compared to spectrum sensing with a single antenna, substantial performance improvements are offered by utilizing the described antenna selection method where the same length of the sensing slot t is applied. In addition, increasing the number of antennas will further improve the sensing performance. The diversity order is shown in FIG. 6, where an improved sensing performance is confirmed by using multiple antennas under one RF chain. Results also show that serial sensing using one RF chain with four antennas gives a even better sensing performance than two RF chains with two antennas under practical requirements (e.g. $P_d>0.9$). This indicates that it is possible to obtain a better sensing performance with less hardware cost and energy consumption considering expensive and high energy consumption of RF chain and relative cheap antennas. Results from "Sensing performance of energy detector with correlated multiple antennas" (S. Kim, J. Lee, H. Wang, D. Hong, IEEE Signal Processing Letters, Vol. 16, No. 8, pp. 671-674, August 2009) are reproduced for comparison purposes, where a better sensing performance is presented and no sensing gain can be obtained by using the serial antenna selection sensing algorithm. However the Kim et al. results are based on the assumption that channel gains are independent at each sensing sample (i.e. $H_1:y_i(n)=h_i(n)s_i(n)u_i(n)$). This is a less practical and strong assumption under a sensing sub-slot period of the order of microsecond-millisecond with a sample frequency of 6 MHz. Practical assumptions usually claims that the channel gain of $i^{th}$ sub-slot, h, is assumed to be constant during any particular sensing sub-slot.

Figure 7:
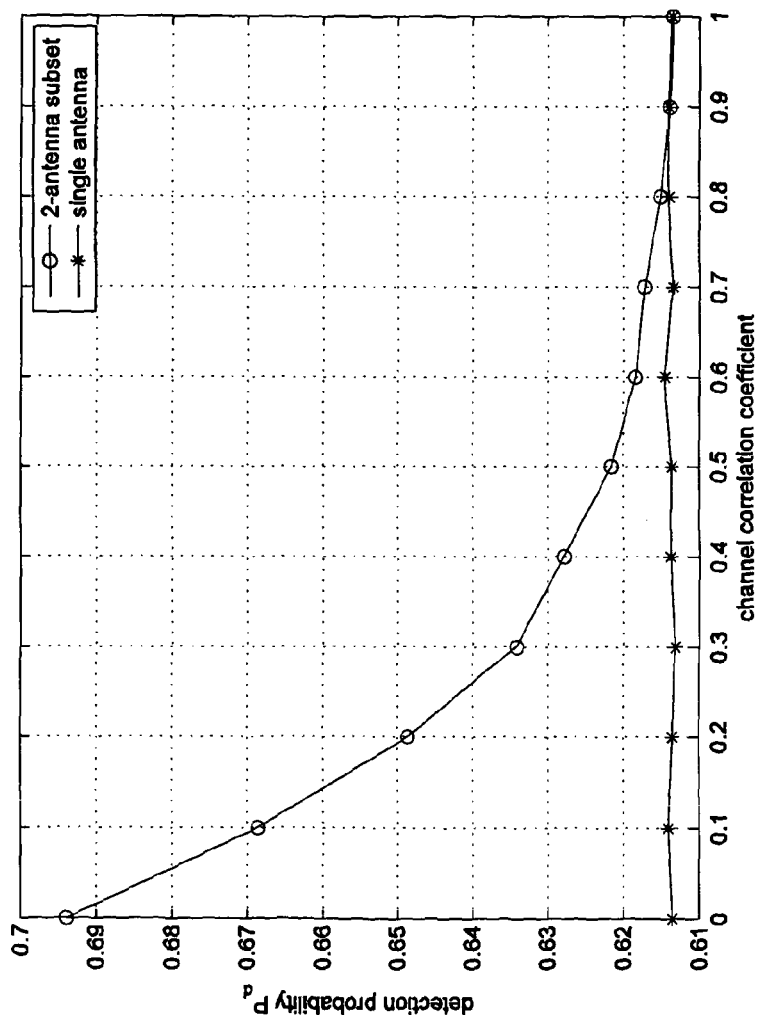

In addition, the performance gain will saturate when a certain number of antennas is reached. As expected, when correlated antennas are introduced, the performance will degrade as shown in FIG. 7. The reader will note that SNR values in the simulations are all set as −10 dB except for in FIG. 6. In the case when different antennas have different SNR receptions, the advantages of using antenna selection can be further presented (e.g. using a SNR-weighted selection criterion). Furthermore, an additional performance gain can be achieved when the channel gain of each antenna/sub-slot is known and thus using different weighting factors accordingly.

Figure 8:
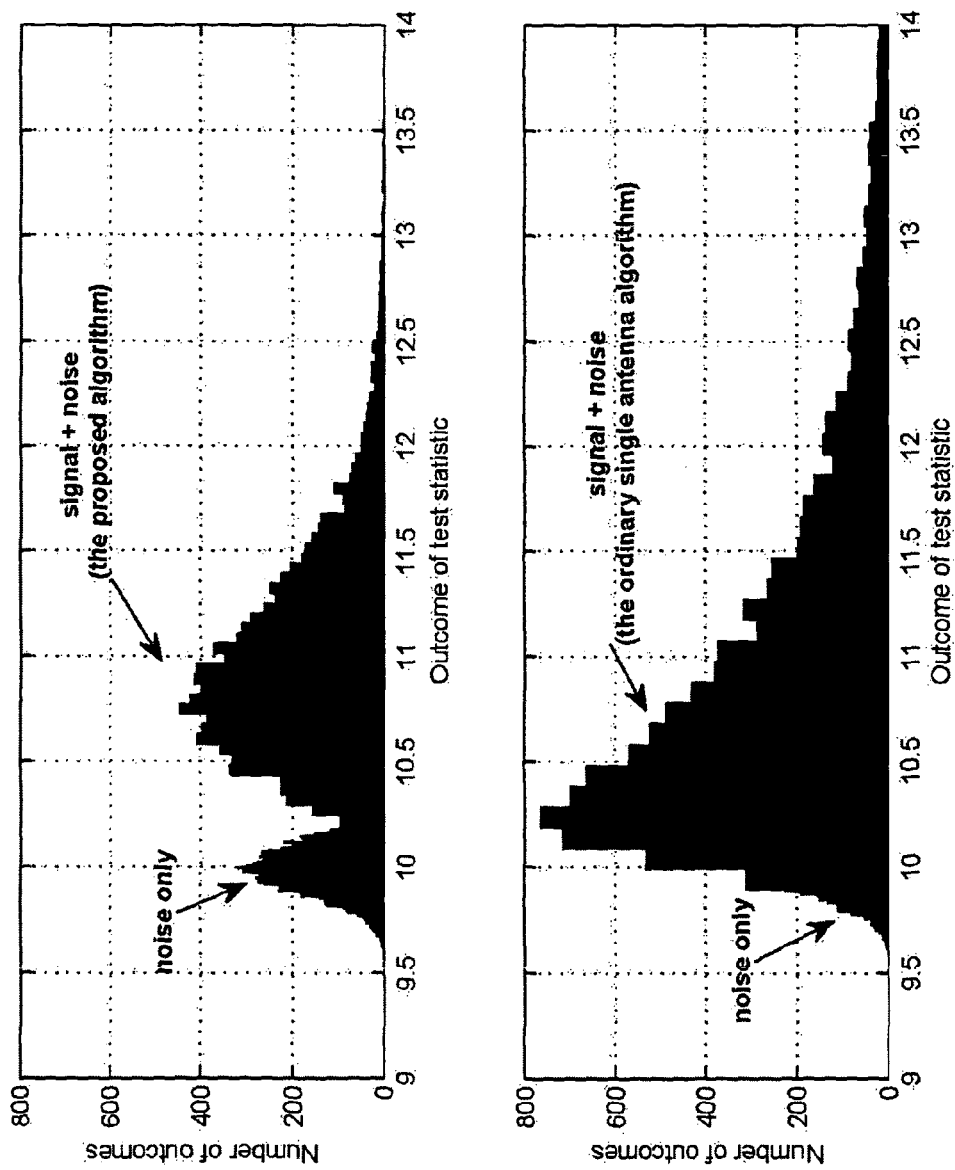

FIG. 8 shows the histogram/distributions of the test statistics from two different algorithms. The upper sub-figure shows the above described antenna selection based sensing algorithm. The lower sub-figure gives the distributions of the test statistic from an ordinary sensing algorithm. As shown in FIG. 8, using the described algorithm, a better detection probability is expected to be achieved under a target false alarm probability.

Figure 9:
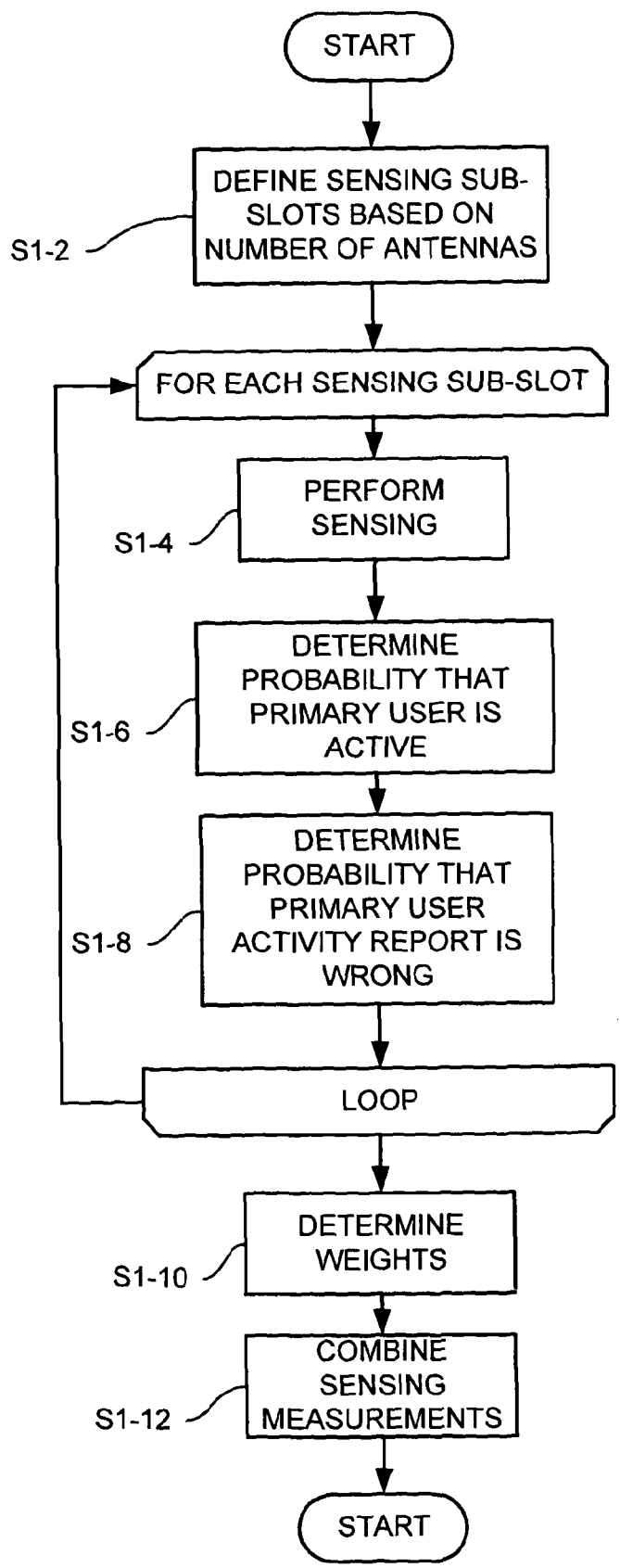
FIG. 9 is a flow diagram illustrating operation of the controller in accordance with the described embodiment.

FIG. 9 summarises the process conducted by the controller in accordance with this embodiment. In step S1-2, the controller determines how many antennas it is controlling, and therefore how many sensing slots, in time, it should divide the sensing period into. It conducts this division.

In a For loop, defined by the number of sensing slots, steps are carried of for each sensing slot. In step S1-4, a sensing operation is carried out. Then, in steps S1-6 and S1-8 respectively, probabilities are determined as to whether the primary user is active, and the uncertainty of the first probability determination, i.e. whether the activity report represented by the first probability is wrong.

These measures, for each sensing slot, are then taken forward to a combining phase, in a first step of which, step S1-10, the controller determines weights to be applied to each of the sensing measurements. The sensing measurements are then combined, in accordance with the weights, in step S1-12, in accordance with the principle of data fusion. On the basis of the fused data, antenna selection can then be carried out for data detection.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method of determining antenna selection data, for use in a multi-antenna communications apparatus, comprising
    allocating a sensing period into a plurality of sequential sensing slots, the number of sensing slots being dependent on the number of antennas,
    for a first sensing slot, sensing in a communications channel of interest on a first antenna set, the first set comprising one or more of the plurality of antennas, to produce channel activity information for the first sensing slot,
    for a second sensing slot, sensing in the communications channel of interest on a second antenna set, the second antenna set comprising one or more of the plurality of antennas, the second set being non-identical to the first set, to produce channel activity information for the second sensing slot, and
    combining the resultant channel activity information for the plurality of sensing slots to form a channel activity report.

2. A method in accordance with claim 1 wherein the combining comprises performing a weighted sum on the channel activity information for the plurality of sensing slots.

3. A method in accordance with claim 2 and comprising determining a set of weights for use in said weighted sum.

4. A method in accordance with claim 3 and comprising determining a channel gain, the weights being dependent on the channel gain.

5. A method in accordance with claim 1 wherein the channel activity report comprises a measure of energy detected on the communications channel of interest, on the basis of which a determination can be made as to whether the channel is in use.

6. A method in accordance with claim 1 wherein the union of the sets of antennas sensed over the sensing slots defined in a sensing period comprises all antennas available for sensing.

7. A method in accordance with claim 1 and comprising generating a radio communication emission at one or more antennas, in response to a determination from the channel activity report that the channel is not in use.

8. A non-transitory computer-readable medium storing computer implementable instructions which, when executed by suitable general purpose apparatus, cause that apparatus to perform a method in accordance with claim 1.

9. A radio communications apparatus comprising:
a plurality of antennas for, selectively, emission or reception of radio signals; and
circuitry configured to
allocate a sensing period into a plurality of sequential sensing slots, the number of sensing slots being dependent on the number of antennas;
sense, in a first sensing slot, in a communications channel of interest on a first antenna set, the first set comprising one or more of the plurality of antennas, to produce channel activity information for the first sensing slot;
sense, in a second sensing slot, in the communications channel of interest on a second antenna set, the second antenna set comprising one or more of the plurality of antennas, the second set being non-identical to the first set, to produce channel activity information for the second sensing slot; and
assemble a channel activity report by combining the resultant channel activity information for the plurality of sensing slots.

10. Apparatus in accordance with claim 9 wherein the circuitry is configured to combine by way of performing a weighted sum on the channel activity information for the plurality of sensing slots.

11. Apparatus in accordance with claim 10 wherein the circuitry is configured to determine a set of weights for use in said weighted sum.

12. Apparatus in accordance with claim 11 wherein the circuitry is configured to determine a channel gain, the weights being dependent on the channel gain.

13. Apparatus in accordance with claim 9 wherein the circuitry is configured to generate a channel activity report comprising a measure of energy detected on the communications channel of interest, on the basis of which a determination can be made as to whether the channel is in use.

14. Apparatus in accordance with claim 9 wherein the union of the sets of antennas sensed over the sensing slots defined in a sensing period comprises all antennas available for sensing.

15. Apparatus in accordance with claim 9 wherein the circuitry is configured to generate a radio communication emission at one or more antennas, in response to a determination from the channel activity report that the channel is not in use.

* * * * *